G. D. Allen.
Hemp Brake.
No. 12,472.    Patented Mar. 6, 1855.
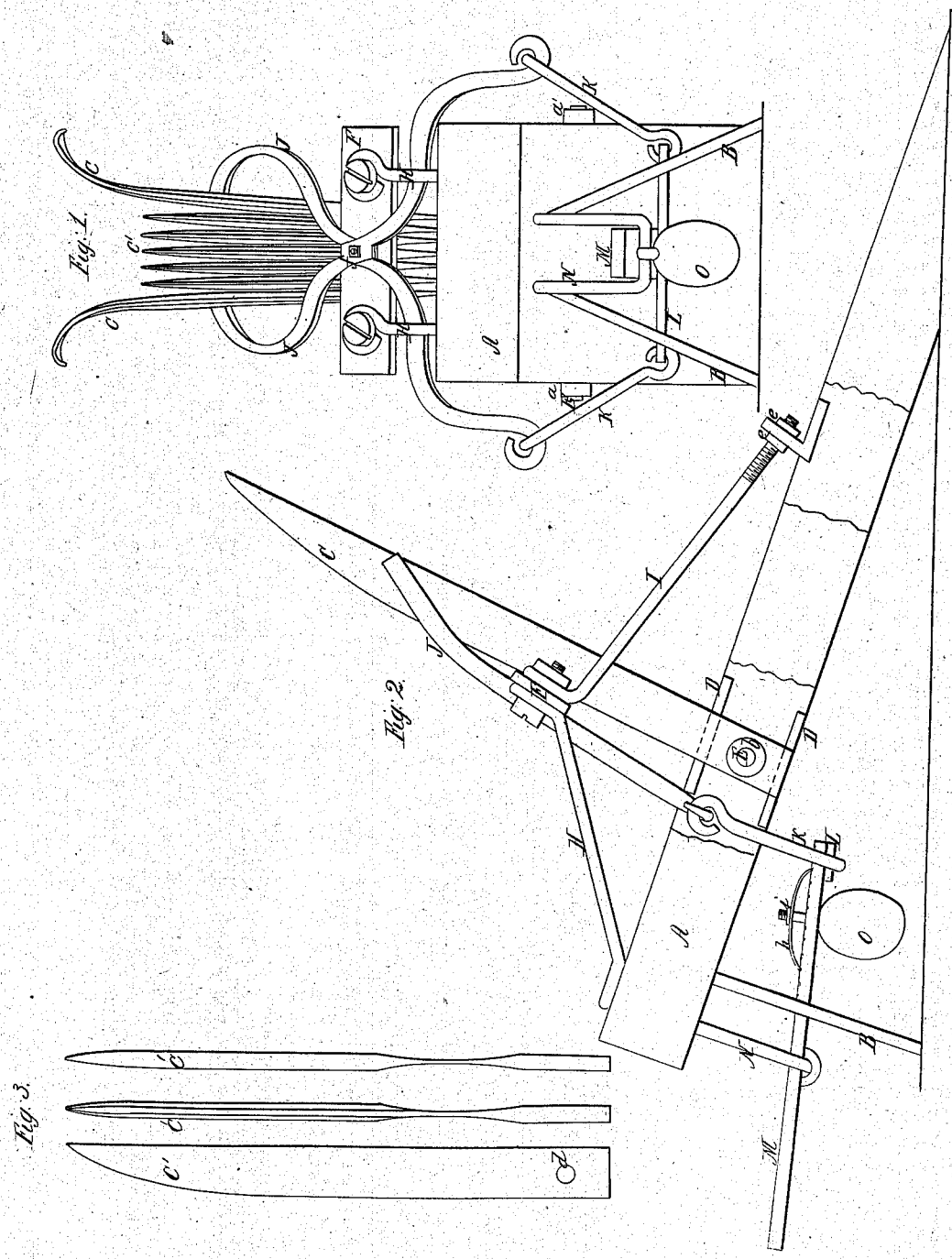

UNITED STATES PATENT OFFICE.

GEO. D. ALLEN, OF KEY WEST, FLORIDA.

IMPROVEMENT IN MACHINES FOR CLEANING SISAL HEMP AND STRIPPING SEED FROM BROOM-CORN.

Specification forming part of Letters Patent No. 12,472, dated March 6, 1855.

*To all whom it may concern:*

Be it known that I, GEORGE D. ALLEN, of Key West, in the county of Monroe and State of Florida, have invented a new and useful Machine for Separating the Pulp from Sisal Hemp, the Seed from Broom-Corn, and for other Purposes; and I do hereby declare that the same is described and represented in the following specification and drawings.

To enable others skilled in the art to make and use my invention, I will proceed to describe its construction and use, referring to the drawings, in which the same letters indicate like parts in each of the figures.

Figure 1 is an elevation of the front end. Fig. 2 is an elevation of one side.

The nature of my invention consists in a series of yielding prongs, which may be made elastic or otherwise, so constructed and arranged as to stand a proper distance apart when the material to be operated upon is inserted, when they may be pressed together by a spring or weight, or both, or such other device, as will press the prongs together and continue to close them as the material drawn through diminishes in thickness, so as to remove the pulp or seed or other substance, as desired, from the material acted upon.

In the accompanying drawings, A is a platform, elevated at one end by the legs B B. In this platform I make a mortise for the ends of the prongs C C and C'. I make two metal plates, D D, with holes in them the same size as the mortise, and fasten them upon each side of the platform, (around the mortise,) as represented in Fig. 2, where the edge of the platform is represented as broken away to show the other parts more clearly. The prongs C C are made in the form represented—that is, with the front edge thinner than the back—and they are also made thinner between the platform and bar F, so as to spring and vibrate freely when used, and tapered where they come together at the lower ends, so as to stand about half an inch open at the bar F. The front and back edges and the side of one of the middle prongs, C', are represented in Fig. 3. The platform and prongs are perforated for the rod E, which passes through them, and is provided with screw-nuts *a a'* at each end of the rod. It is also provided with a shoulder at a proper distance from the nut *a*, to press against and hold one of the prongs C in its proper position when the prongs are pressed together. The rod E is put through the platform and prongs, and the nut *a* put on; then the tube *b*, (which is longer than the thickness of the platform outside of the mortise,) is put onto the rod E, and the nut *a'* is screwed on, so as to press the tube against the prongs, and the prongs together against the shoulder on the rod, as above mentioned, so as to hold them all firmly, the ends of the prongs being made tapering around the holes *d*, as above mentioned. The bar F is held in the required position by the braces H H and I, (only one of the latter being represented in the drawings,) which are fastened or connected to the bar F and platform A, as represented. This bar prevents the prongs from being drawn over while using the machine, and it may be elevated or depressed to graduate the inclination of the prongs, as required, by turning the nuts *e e* on the braces I. The pivot *f*, upon which the spring-levers J J vibrate, is fastened in the center of the bar F, and is provided with a screw-nut to secure the levers in their places. These levers J J may be made in the form represented, or in such other form as may be desirable, and they are connected by the links K K to the bar L under the platform, which bar is fastened to the end of the foot-lever M, which vibrates on the staple N, fastened into the platform, as represented. The lever M is provided with a slot for the stem of the weight O, which passes up and through the spring *h*, and is fastened by the nut *i*. The lever M is provided with scores for the lower end of the spring *h*, so as to prevent it from slipping after the weight O is adjusted in the required position upon the lever M, so as to force the levers J J against the prongs and press them together, as required, for the material operated upon by the machine.

The machine having been constructed and completed, as above described, and some leaves of the *Agave Americana*—sisal hemp—having been properly crushed by being passed through between two rollers, or otherwise, so as to soften the pulp of the leaves without breaking or cutting the fiber, the operator seizes one end of the leaves, (the butt should be preferred,) and at the same time depresses the lever M with his foot, so as to allow the prongs to spring open. He then inserts the opposite parts between the prongs and raises his foot, so as to allow the weight and levers J J to close the prongs upon the leaves while he draws them through, when he applies his foot to the lever again and repeats the operation as many times as may be necessary to clean the fiber. When he has cleaned one end, he lays hold of the cleaned portion and cleans the opposite end in the same manner.

To remove the seed from broom-corn the operator seizes the butt-ends and inserts the brush ends between the prongs and draws it toward him, so as to pull off the seed. In the first part of the process he may keep his foot on the lever M until a portion of the seed is removed. He can then remove his foot and complete it.

Although I prefer prongs made in the form described for cleaning sisal hemp, and perhaps for some other purposes, yet I contemplate making them of such form and of such material as may be best adapted for the purposes to which they are to be applied; also, that the prongs may be made stiff and allowed a little play on the rod E, and opened by some kind of spring or other device, so as to insert the material to be operated upon; or, if left sufficiently loose, the material may be made to separate them as it is inserted between them.

I have described the processes of separating the pulp from sisal hemp, the seed from broom-corn, and I expect to apply my invention to such other uses and purposes as may be desirable.

I further contemplate that my invention may be modified in various ways which readily suggest themselves to intelligent mechanics, so as to adapt it to the various purposes for which it may be used to advantage, without departing from the principles or merits of my said invention.

What I claim as my invention, and desire to secure by Letters Patent, is—

The combination of the prongs C, arranged substantially as described, with the spring-levers G G, or their equivalents, constructed and operated substantially in the manner and for the purposes set forth.

Signed at the city of New York, in the county and State of New York, this the 2d day of December, A. D. 1854.

GEORGE D. ALLEN.

Witnesses:
FREDK. SEELY,
J. G. EMERY.